United States Patent
Duda et al.

(10) Patent No.: US 11,237,874 B2
(45) Date of Patent: Feb. 1, 2022

(54) SYSTEM AND METHOD FOR MANAGING LOW COMPUTING RESOURCE STATE

(71) Applicant: Arista Networks, Inc., Santa Clara, CA (US)

(72) Inventors: Kenneth James Duda, Santa Clara, CA (US); Itthichok Jangjaimon, San Jose, CA (US); Andre Abreu Calfa, Santa Clara, CA (US); Robert Eugene Gilligan, Burlingame, CA (US); Roman Olegovich Chertov, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 160 days.

(21) Appl. No.: 16/677,650

(22) Filed: Nov. 7, 2019

(65) Prior Publication Data
US 2021/0034427 A1 Feb. 4, 2021

Related U.S. Application Data

(60) Provisional application No. 62/882,410, filed on Aug. 2, 2019.

(51) Int. Cl.
*G06F 9/46* (2006.01)
*G06F 9/50* (2006.01)

(52) U.S. Cl.
CPC .......... *G06F 9/5027* (2013.01); *G06F 9/5016* (2013.01); *G06F 9/5022* (2013.01); *G06F 9/5083* (2013.01); *G06F 2209/503* (2013.01)

(58) Field of Classification Search
CPC .... G06F 9/5027; G06F 9/5016; G06F 9/5022; G06F 9/5083; G06F 2209/503
See application file for complete search history.

(56) References Cited

U.S. PATENT DOCUMENTS

2016/0070596 A1* 3/2016 Anand ................. G06F 9/4843
718/104
2021/0004273 A1* 1/2021 You ....................... G06F 9/5066

OTHER PUBLICATIONS

"Use Low Power Mode to save battery life on your iPhone"; Apple Inc., Apple Support; Sep. 14, 2018; https://web.archive.org/web/20180914052116/https://support.apple.com/en-us/HT205234.

* cited by examiner

*Primary Examiner* — Gregory A Kessler
(74) *Attorney, Agent, or Firm* — Chamberlain, Hrdlicka, White, Williams & Aughtry

(57) ABSTRACT

A network device includes computing resources for utilization by processes hosted by the network device and a computing resources manager. The computing resources manager automatically instantiate a new instance of a first process of the processes upon termination of the first process; makes a determination that the network device has entered an out of computing resources state; and in response to the determination: performs an action set to increase a quantity of the computing resources that are available for allocation to the processes.

17 Claims, 12 Drawing Sheets

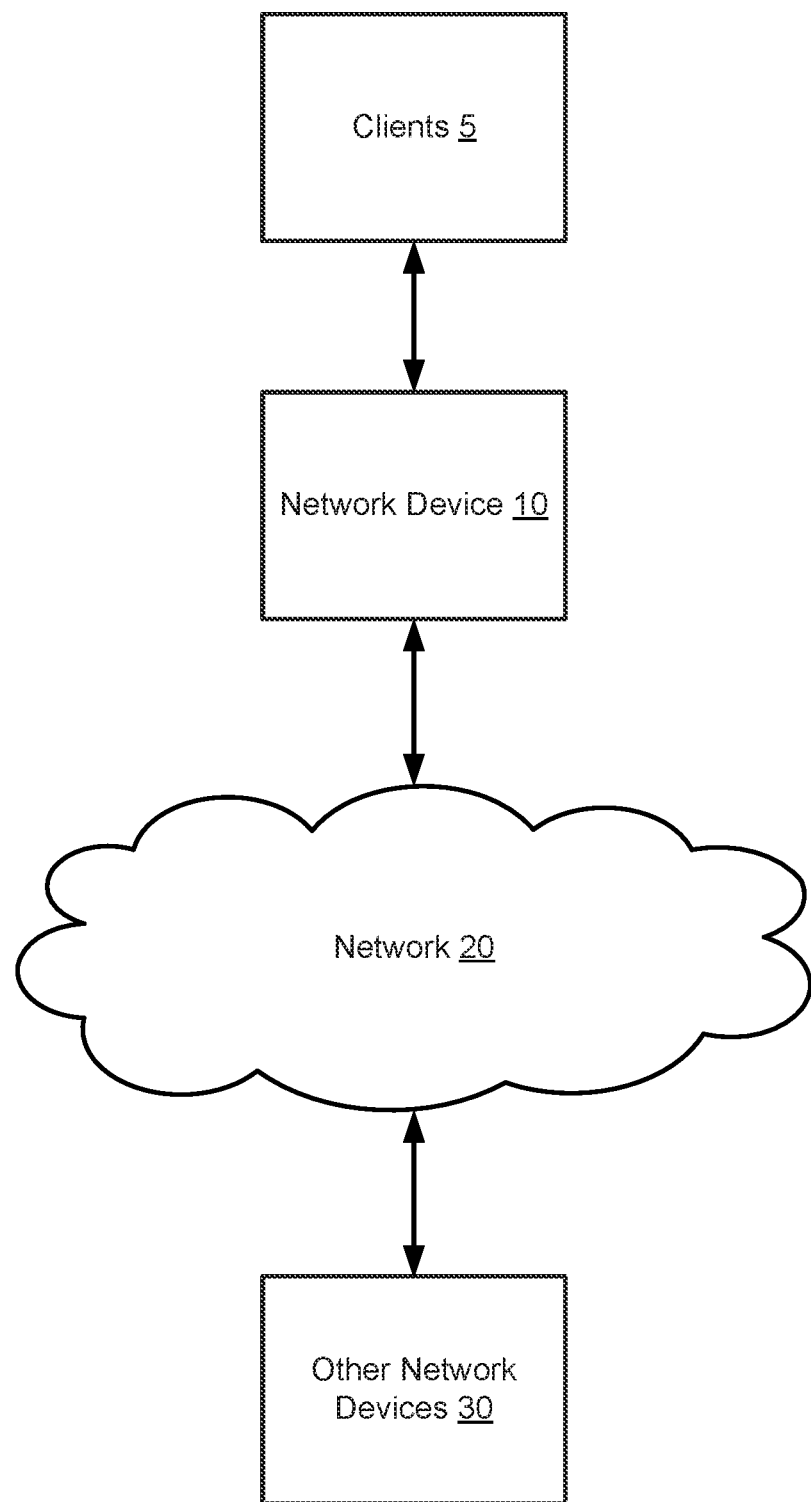
FIG. 1.1

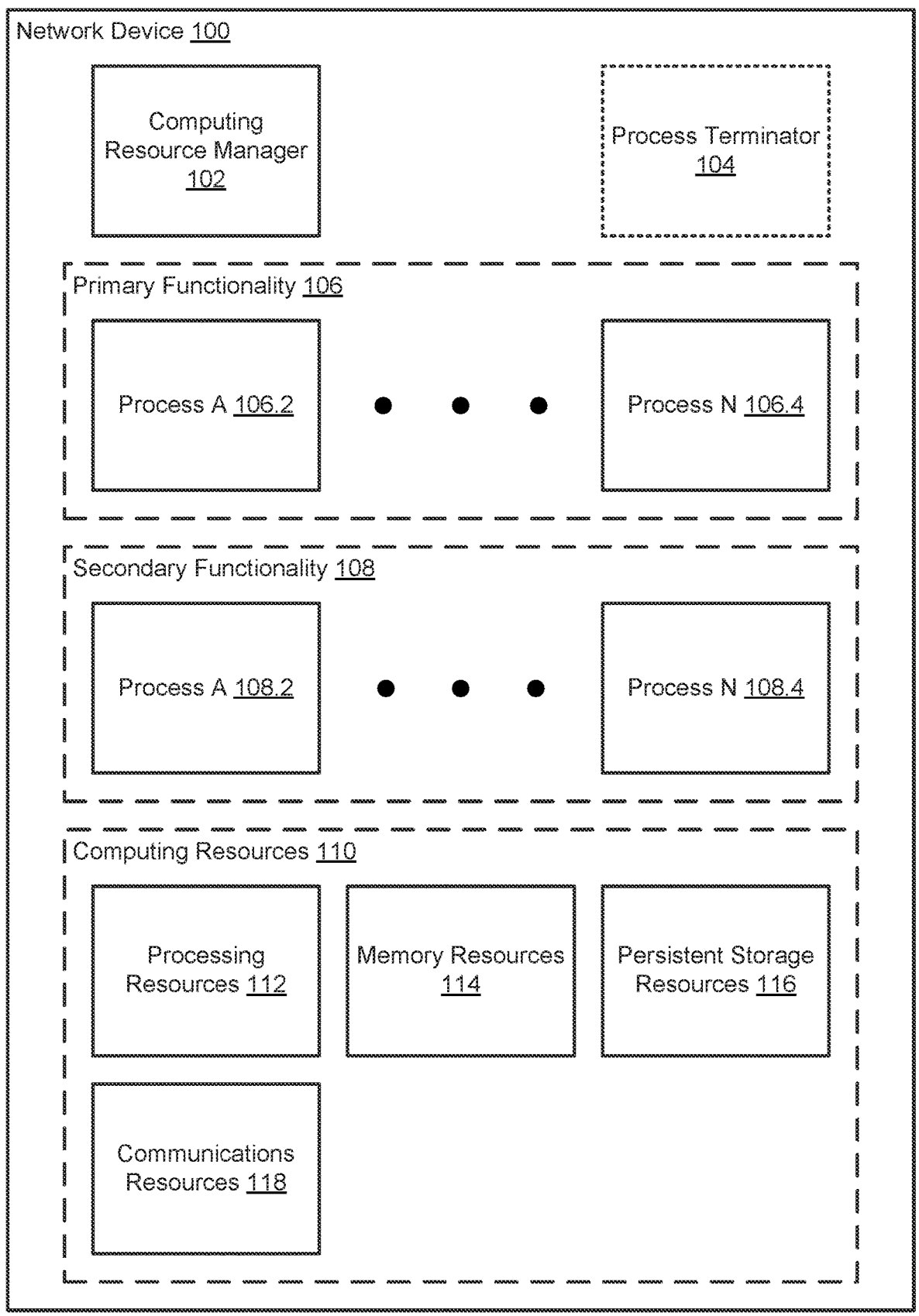
FIG. 1.2

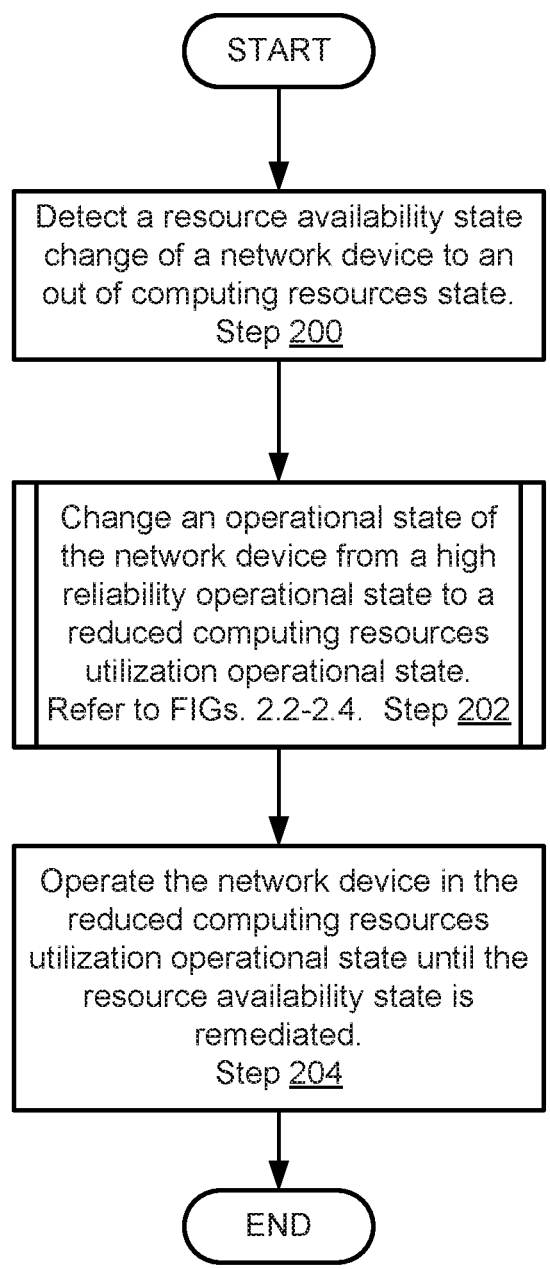
FIG. 2.1

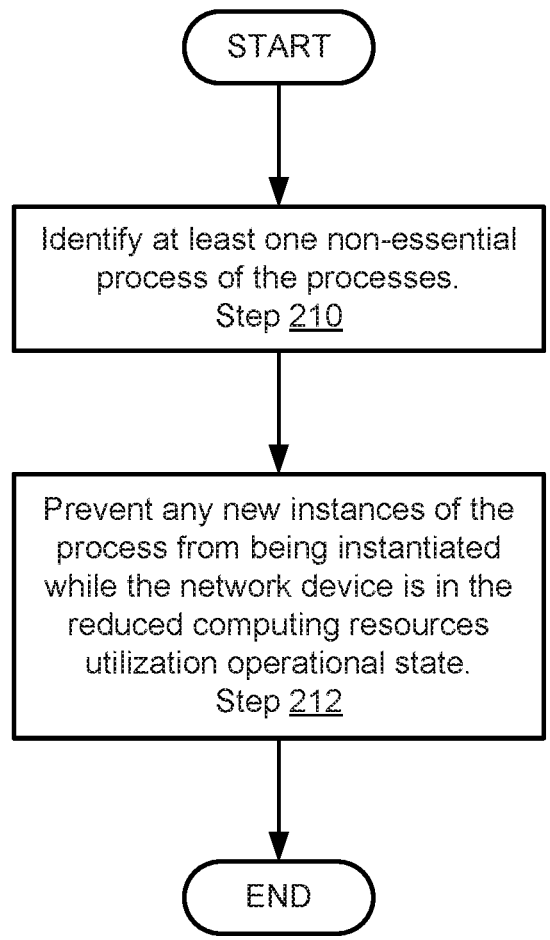
FIG. 2.2

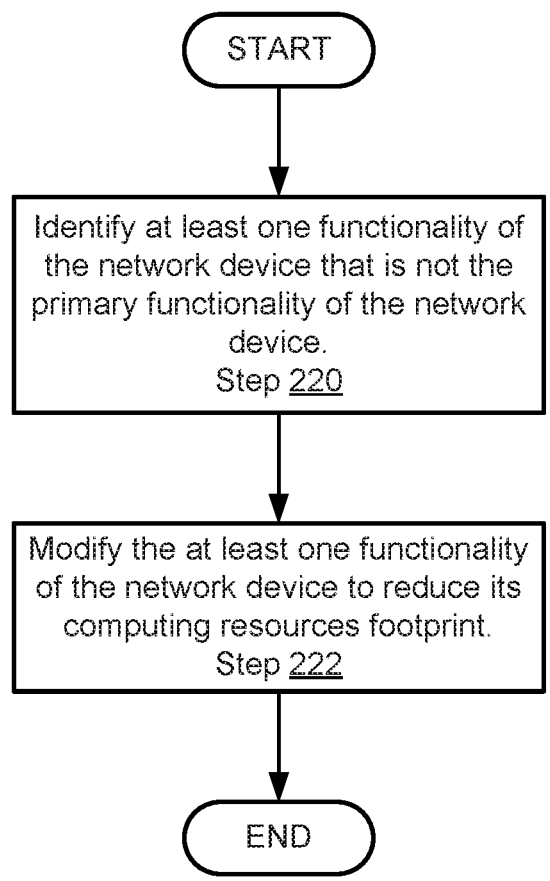
FIG. 2.3

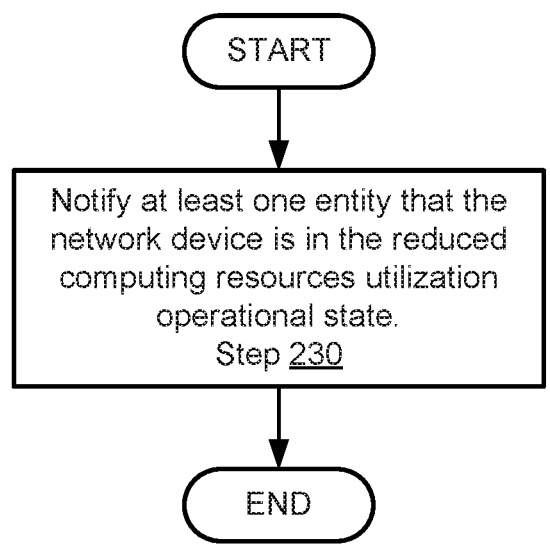
FIG. 2.4

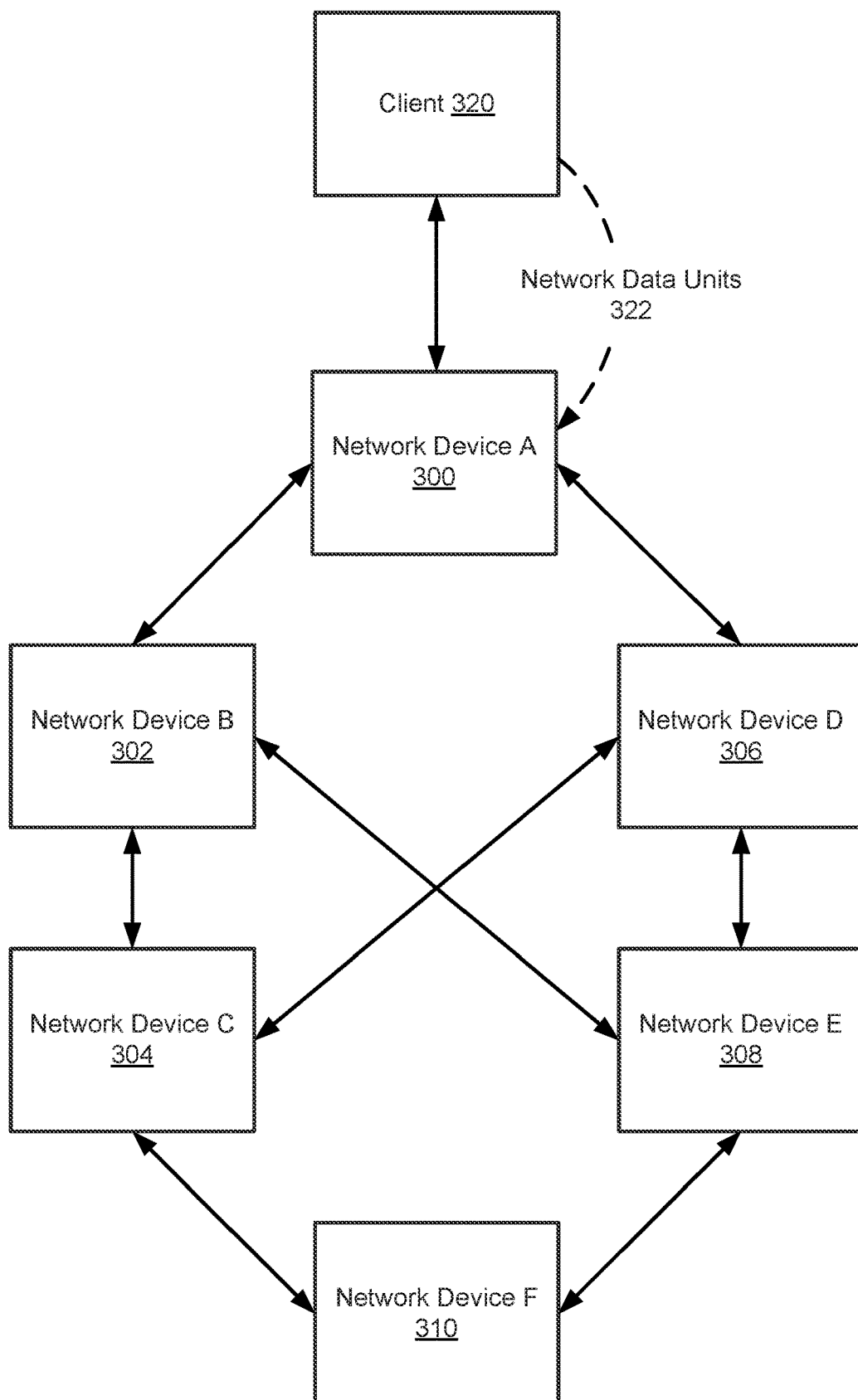
FIG. 3.1

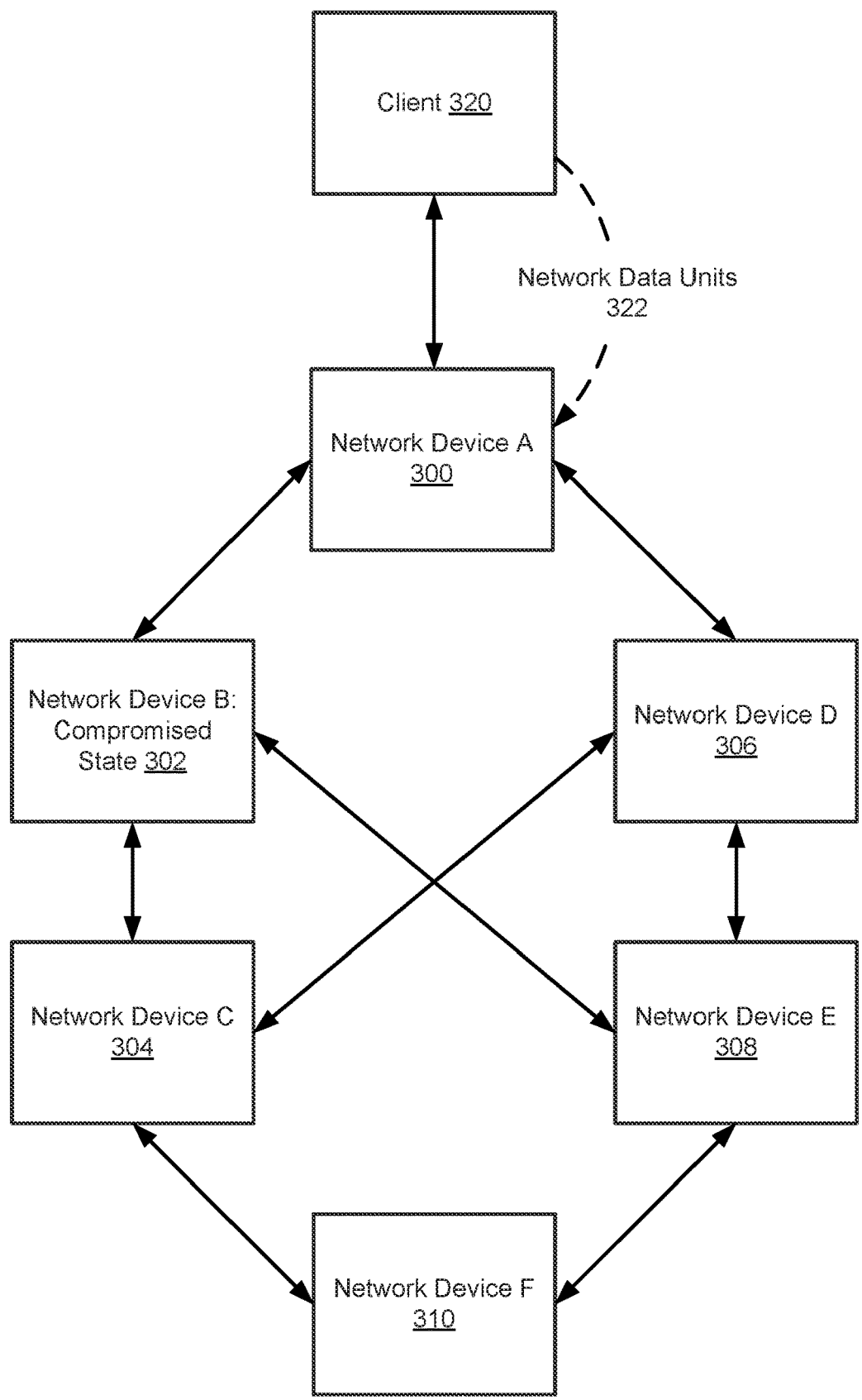
FIG. 3.2

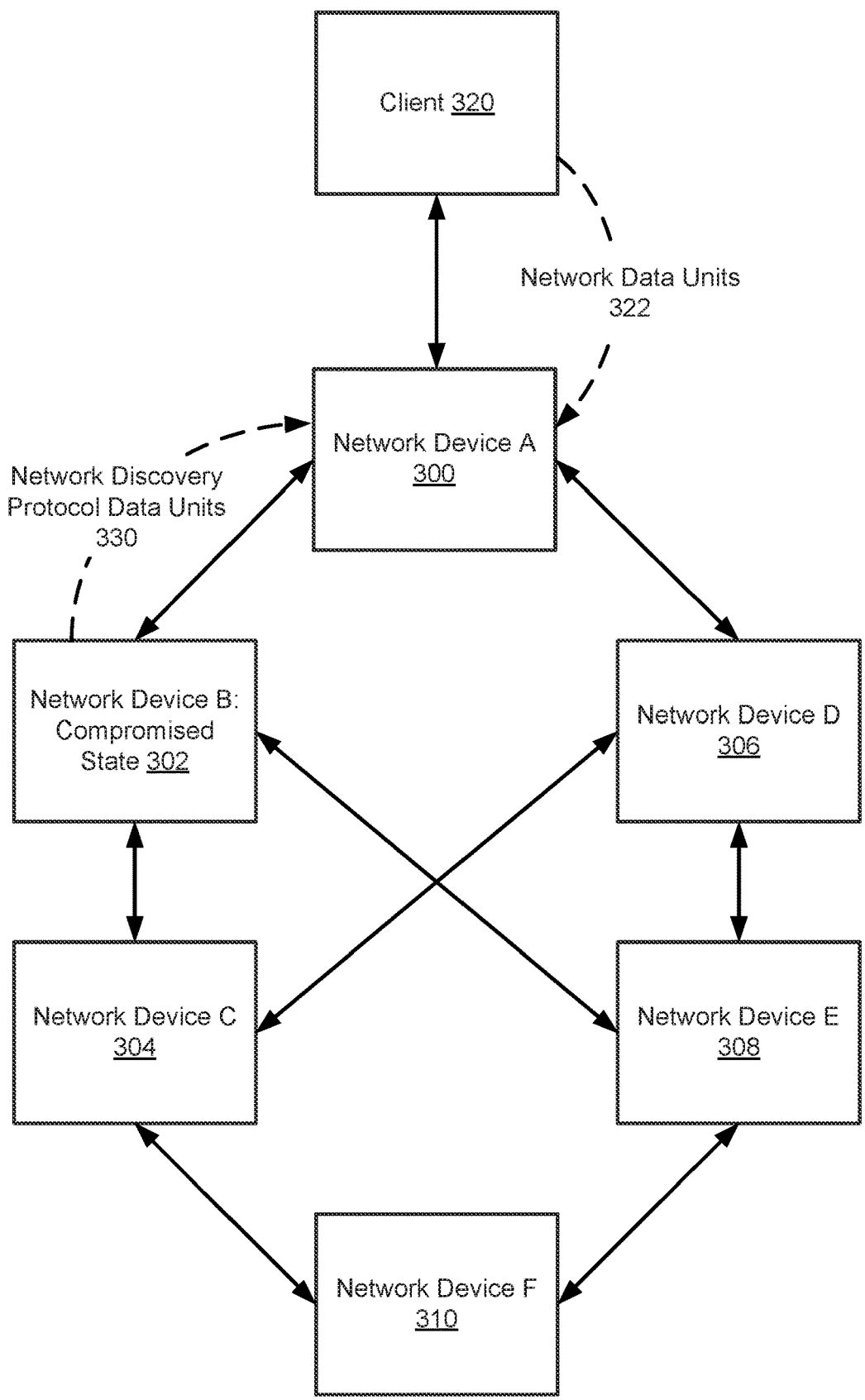
FIG. 3.3

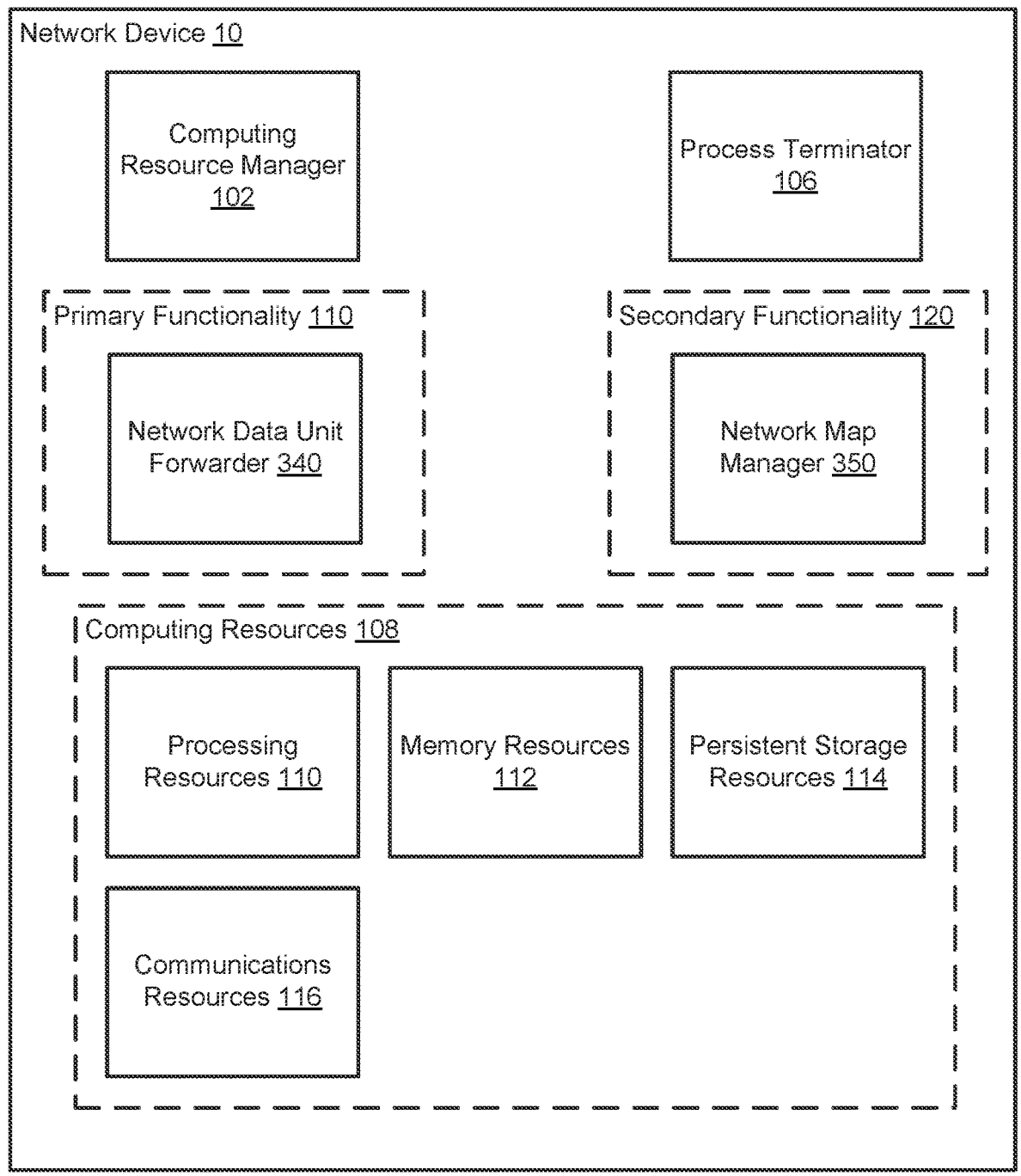
FIG. 3.4

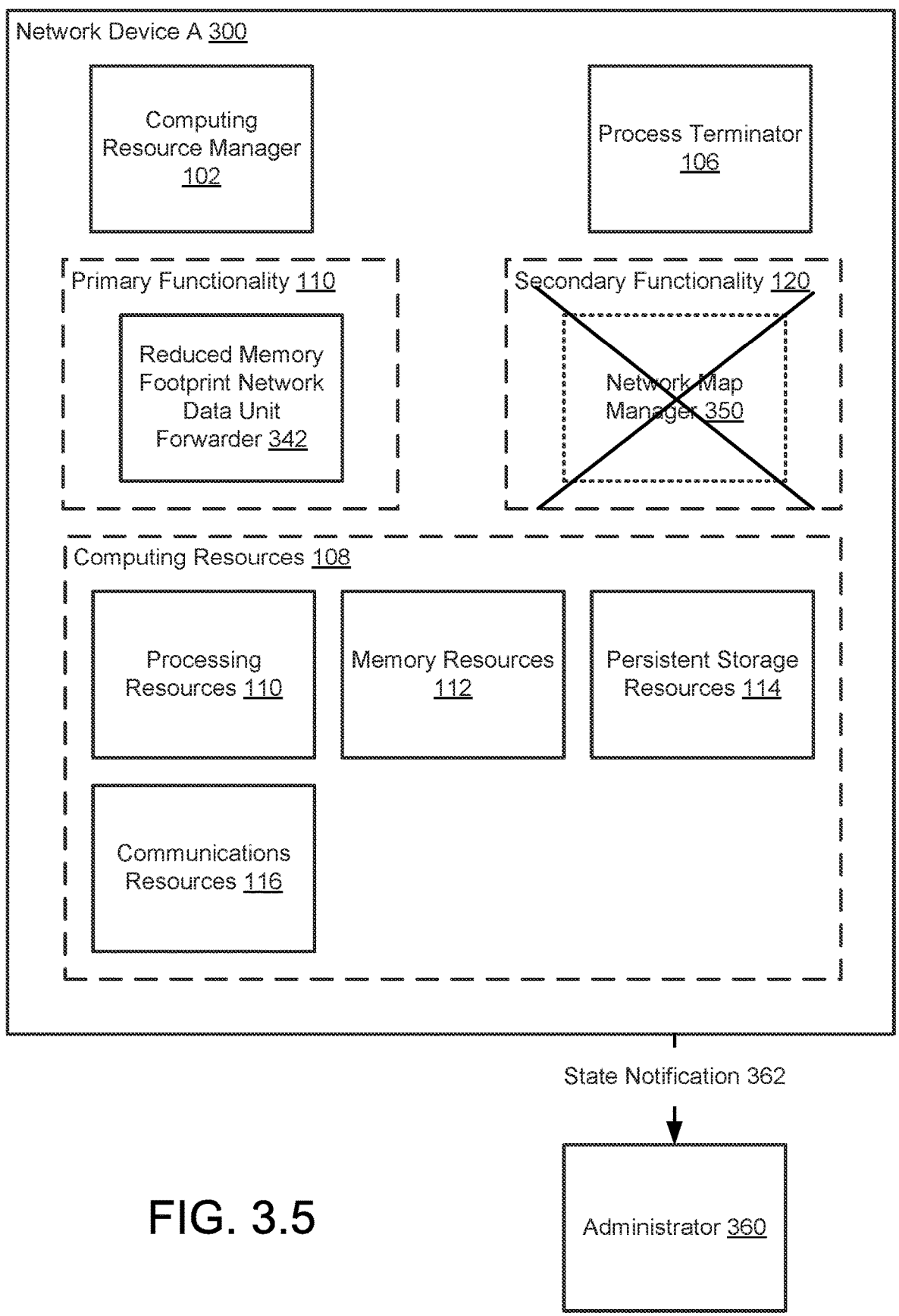
FIG. 3.5

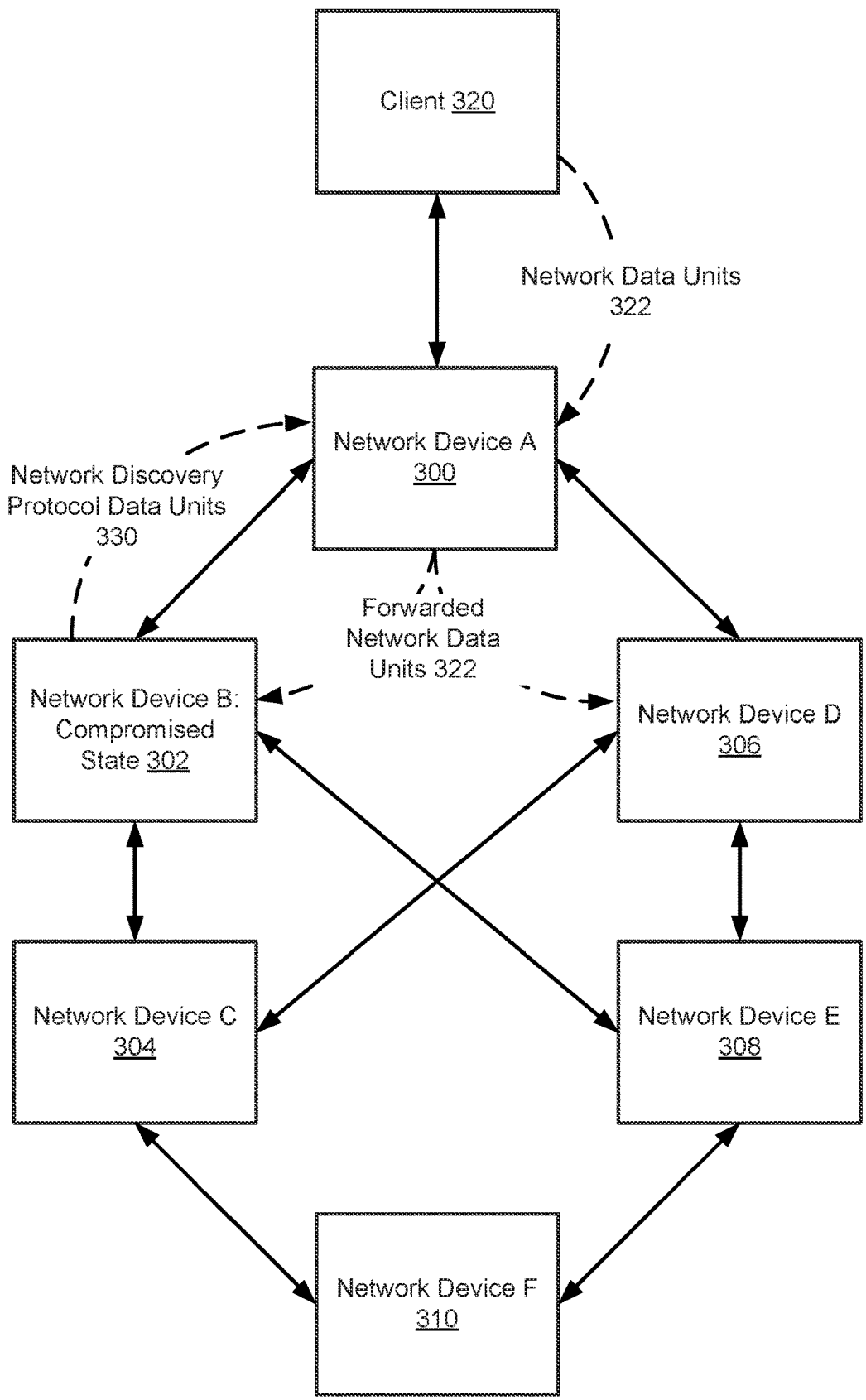
FIG. 3.6

SYSTEM AND METHOD FOR MANAGING LOW COMPUTING RESOURCE STATE

BACKGROUND

Computing devices may utilize computing resources to perform their functionality. For example, computing devices may utilize processing resources to execute instructions, memory resources to temporarily store data, storage resources to store data long term, etc.

Computing devices may include a limited quantity of computing resources. For example, computing devices may include a finite number of processors that provide processing resources, memory modules that provide memory resources, storage devices that provide storage resources, etc.

SUMMARY

In one aspect, a network device in accordance with one or more embodiments disclosed herein includes computing resources for utilization by processes hosted by the network device and a computing resources manager. The computing resources manager automatically instantiate a new instance of a first process of the processes upon termination of the first process; makes a determination that the network device has entered an out of computing resources state; and in response to the determination: performs an action set to increase a quantity of the computing resources that are available for allocation to the processes.

In one aspect, a method in accordance with one or more embodiments disclosed herein includes automatically instantiating a new instance of a first process of processes upon termination of the first process, the processes are hosted by a network device, the processes utilize computing resources of the network device; making a determination that the network device has entered an out of computing resources state; and in response to the determination: performing an action set to increase a quantity of the computing resources that are available for allocation to the processes.

In one aspect, a non-transitory computer readable medium in accordance with one or more embodiments disclosed herein includes computer readable program code, which when executed by a computer processor enables the computer processor to perform a method. The method includes automatically instantiating a new instance of a first process of processes upon termination of the first process, the processes are hosted by a network device, the processes utilize computing resources of the network device; making a determination that the network device has entered an out of computing resources state; and in response to the determination: performing an action set to increase a quantity of the computing resources that are available for allocation to the processes.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 2.1 shows a flowchart of a method of operating a network device in accordance with one or more embodiments disclosed herein.

FIG. 2.2 shows a flowchart of a first method of changing the operating state of a network device in accordance with one or more embodiments disclosed herein.

FIG. 2.3 shows a flowchart of a second method of changing the operating state of a network device in accordance with one or more embodiments disclosed herein.

FIG. 2.4 shows a flowchart of a third method of changing the operating state of a network device in accordance with one or more embodiments disclosed herein.

FIGS. 3.1-3.6 show a non-limiting example of a system at different point in time in accordance with embodiments disclosed herein.

DETAILED DESCRIPTION

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for improving the likelihood that one or more devices are able to provide their primary functionality when an out of computing resources state occurs. An out of computing resources state may occur when a device is unable to allocate memory resources (or other types of computing resources) that need to be allocated to enable the device to perform its primary functionality. For example, an out of computing resources state may occur when all of a device's memory resources are allocated and a process that contributes to the primary functionality of the device requests that additional memory resources be allocated to the process. The primary functionality may be, for example, network data unit forwarding functionality.

A device in accordance with embodiments described herein may change its mode of operation when it encounters an out of computing resources state. In the changed mode of operation, the device may sacrifice its ability to perform secondary functionality to free up computing resources for allocation to other processes. By doing so, now-free computing resources may be allocated to improve the likelihood that the device is able to perform its primary functionality. The secondary functionality may be different from the primary functionality. The secondary functionality may not contribute to the ability of the device to perform its primary functionality.

When in the changed mode of operation, the device may (i) sacrifice its ability to perform secondary functionality by preventing processes from being instantiated, (ii) restart existing processes to decrease the computing resources footprint of the processes, (iii) disable portions of the functionality of the device, and/or (iv) notify an administrator or other entity of entering the out of computing resources state. By doing so, computing resources may be freed to enable additional computing resources to be allocated in a manner that supports the primary functionality of the device.

FIG. 1.1 shows a diagram of an example system in accordance with one or more embodiments described herein. The system may include clients (5) that utilize services provided by a network device (10). The services provided by the network device (10) may include, for example, network data unit forwarding services. By forwarding network data units, the network device (10) may enable the clients (5) to communicate with other devices (e.g., network 20, other network devices (30)).

For example, the network device (10) may be operably connected to other network devices (30) via a network (20). The network device (10), network (20), and other network devices (30) may cooperate (e.g., all implement one or more common network communication protocols) to forward network data units to each other. The network device (10) may also forward network data units to the clients (5). The network data units may include messages destined for the various devices of the example system.

Forwarding network data units may consume computing resources of the devices of FIG. 1.1. For example, when a network data unit is sent from the clients (5) to the network device (10), the network device (10) may need to perform one or more actions to determine to which device (e.g., a device of the network (20) or another device not illustrated in FIG. 1.1) to forward the network data unit.

While each of the devices of FIG. 1.1 are illustrated as being operably connected to other devices using lines having double ended arrows as ends, such lines may represent any number of physical connections over which the network data units may be forwarded. For example, the line between the network device (10) and the network (20) may represent ten physical connections between the network device (10) and devices of the network (20). In such a scenario, network data units received by the network device (10) may be forwarded towards the network (20) and/or the other network devices (30) using any of the ten physical connections.

In another example, the line between the network device (10) and the network (20) may represent a connection between the network device (10) and another device (which may be a network device) (not shown) which is, in turn, physically connected to a device of the network (20). In such a scenario, network data units received by the network device (10) may be forwarded towards the network (20) and/or other network devices (30) using the connection to the another device (not shown) and the connection between the another device and the device of the network (20).

To select a physical connection over which to forward network data units, the network device (10) may perform the one or more actions. Performing the one or more actions may consume computing resources of the network device (10). For example, the network device (10) may need to access data structures that are stored in memory (i.e., consume memory resources), perform computations (i.e., consume processing resources), and/or perform other actions that consume computing resources. Depending on the demand for computing resources of the network device (10), the network data unit forwarding capacity of the network device (10) may become limited (e.g., insufficient computing resources to complete the one or more actions necessary to forward a network data unit) which may impact the ability of the network device (10) to provide its various functionalities.

Any of the components of FIG. 1.1 may be operably connected by any combination and/or number of wired and/or wireless connections.

As discussed above, the system of FIG. 1.1 may include network devices that may provide network data unit forwarding services. FIG. 1.2 shows a diagram of a network device (100) in accordance with one or more embodiments described herein. The network device 100 shown in FIG. 1.2 may be similar to the network device 10 shown in FIG. 1.1.

The network device (100) may provide any number of functionalities, including network data unit forwarding functionality. A primary functionality (106) of the functionalities may be providing communication services to other devices. Providing communication services may include, for example, forwarding network data units within a network environment. To do so, the network device (100) may be operably connected to any number of other devices (e.g., clients, networks, other network devices not shown) via any combination and number of wired and/or wireless networks.

The functionalities of the network device (100) may also include secondary functionality (108). Secondary functionality (108) may include any functionality that is not necessary for the network device (100) to provide the primary functionality (106). Secondary functionality (108) may include, for example, providing network topology information to other devices (e.g., providing information that enables other devices to operate within a network environment), updating forwarding information used to forward network data units, triggering Light Emitting Diode (LED) lights on the network device to turn ON or OFF, and/or obtaining statistical information regarding forwarded network data units.

To provide the aforementioned functionalities, the network device (100) may host, entirely or in part, any number of processes (e.g., 106.2, 106.4, 108.2, 108.4). The processes may, when executed, provide all or a part of the functionalities (e.g., 106, 108) of the network device (10). The network device (10) or other devices may store computer instructions that when executed by the network device (10), entirely or in part, give rise to the functionality of the functionalities of the network device (10).

To execute the computer instructions corresponding to the processes, the network device (100) may include computing resources (110). These computing resources may be finite in amount. Consequently, the network device (100) may not always have sufficient computing resources (110) to provide all of its functionalities (e.g., both primary and secondary functionality) that would be provided when operating in a high reliability operational state. When operating in the high reliability operational state, the network device (100) may not ration use of the computing resources (110) for providing its functionalities. Rather, the network device (100) may utilize the computing resources (110) to ensure that all of the functionalities of the network device (100) are being provided.

For example, when operating in the high reliability operational state, the network device (100) may automatically instantiate new instances of processes (e.g., 106.2, 106.4, 108.2, 108.4) hosted by the network device (100) that become terminated. By doing so, the network device (100) may improve the likelihood that all of the processes necessary for the network device (100) to provide all of its functionalities are operating, at the cost of consuming computing resources (110) for operation of the processes supporting the functionalities.

A network device (100) in accordance with one or more embodiments disclosed herein may automatically change its operating state in response to having insufficient computing resources (110) to perform all of its functionalities when operating in a high reliability operational state. The operating state of the network device (100) may be automatically changed to a low computing resource memory utilization state.

In the low computing resource utilization state, the network device (100) may ration the computing resources (110). In other words, the network device (100) may allow computing resources to be used to support some of its functionalities while preventing computing resources to be used to support other of its functionalities. For example, the network device (100) may deny processes corresponding to secondary functionality (108) access to all, or a part, of the computing resources (110).

The network device (100) may ration the computing resources (110) to improve the likelihood that the primary functionality of the network device (100) is able to be provided. For example, the network device (100) may prevent processes that do not contribute to the primary functionality of the network device (100) from consuming all, or a portion, of the computing resources (110). By doing so, it may be made more likely that the network device (10) may have sufficient computing resources available for execution of the processing corresponding to its primary functionality (106).

To provide the above noted functionality of the network device (100), the network device (100) may include a computing resource manager (102), a process terminator (104), processes (e.g., 106.2, 106.4, 108.2, 108.4), and/or computing resources (110). Each of these components of the network device (100) is discussed below.

The computing resources manager (102) may manage the computing resources (110) of the network device (100). Specifically, the computing resource manager (102) may take action to manage the allocation of the computing resources (110) among the processes (e.g., 106.2, 106.4, 108.2, 108.4). The computing resources manager (102) may manage the allocation of the computing resources (110) based on an operating state of the network device (100).

For example, the computing resource manager (102) may not limit allocation of the computing resources (110) to the processes (e.g., 106.2, 106.4, 108.2, 108.4) when the network device (100) is not in an out of computing resources state. An out of computing resources state may be a state in which any of the computing resources (110) have all been allocated in a manner that limits the ability of one or more of the processes (e.g., 106.2, 106.4, 108.2, 108.4) from performing its corresponding functionality. In other words, an out of computing resources state may occur when all of a type of the computing resources (110) may be allocated while demand for additional computing resources of the type of the computing resources (110) exists.

When in an out of computing resources state, the network device's (100) ability to provide its primary functionality (106) may be limited. For example, a lack of availability of one or more of the computing resources (110) (e.g., lack of memory resources (114)) may prevent or otherwise degrade the ability of the network device (100) to forward network data units at a rate commensurate with the normal operation of the network device (100) (and/or other, different, and/or additional primary functionalities).

To provide the above noted functionality of the computing resource manager (102), the computing resource manager (102) may perform all, or a portion, of the methods illustrated in FIGS. 2.1-2.4.

In one or more embodiments disclosed herein, all or a portion of the functionality of the computing resource manager (102) is implemented using a logical entity that utilizes the computing resources (110) of the network device (100) for performing its functionality. For example, the computing resource manager (102) may be implemented using computer instructions stored in persistent storage (e.g., persistent storage resources (116)) that when executed by a processor (e.g., processing resources (112)) of the network device (100) and/or other entities give rise to the functionality of the computing resource manager (102).

In one or more embodiments disclosed herein, all, or a part, of the functionality of the computing resource manager (102) is implemented using a specialized hardware device (e.g., circuitry). The specialized hardware device may be, for example, a digital signal processor, a field programmable gate array, a network data unit processor, or an application specific integrated circuit. The functionality of the computing resource manager (102) may be provided using other types of specialized hardware devices without departing from embodiments disclosed herein.

As noted above, the processes (e.g., 106.2, 106.4, 108.2, 108.4) may provide the functionality of the network device (100). For example, the processes (e.g., 106.2, 106.4, 108.2, 108.4) may provide communication services by forwarding network data units. In another example, the processes (e.g., 106.2, 106.4, 108.2, 108.4) may provide network topology update services by sending network topology information to other entities. In a still further example, the processes (e.g., 106.2, 106.4, 108.2, 108.4) may provide network characterization services by sampling the forwarding of network data units. The processes (e.g., 106.2, 106.4, 108.2, 108.4) may provide any type and/or quantity of services.

In one or more embodiments disclosed herein, the processes (e.g., 106.2, 106.4, 108.2, 108.4) provide services divided into primary functionality (106) and secondary functionality (108).

The primary functionality processes (e.g., 106.2, 106.4) may contribute to the primary functionality (106) of the network device (100, FIG. 1.1). In contrast, the secondary functionality processes (e.g., 108.2, 108.4) may not contribute to the primary functionality of the network device (100, FIG. 1.1). The network device (10) may include any number of primary and secondary functionality processes and the respective quantities of each type of processes may dynamically change over time (e.g., new processes may be instantiated, processes may be terminated, etc.).

When any of the processes (e.g., 106.2, 106.4, 108.2, 108.4) are operating (e.g., executing), the processes (e.g., 106.2, 106.4, 108.2, 108.4) may consume a portion of the computing resources (110, FIG. 1.1). Consequently, terminating one or more of the processes (e.g., 106.2, 106.4, 108.2, 108.4) may free computing resources and enable the freed resources to be allocated to other processes. As will be discussed in greater detail below, the computing resources manager (102) may perform an action set that improves the likelihood that computing resources (e.g., memory resources) will be available for allocation after all of a type of the computing resources (e.g., memory resources) have been allocated. By doing so, embodiments disclosed herein may provide a network device that is more likely to be able to provide its primary functionality with little or no degradation in the provided primary functionality after all of a type of computing resources of the network device (10) have been allocated.

In one or more embodiments disclosed herein, all or a portion of the functionality of the processes (e.g., 106.2, 106.4, 108.2, 108.4) is implemented using a logical entity that utilizes the computing resources (110) of the network device (100) for performing its functionality. For example, the processes (e.g., 106.2, 106.4, 108.2, 108.4) may be implemented using computer instructions stored in persistent storage (e.g., persistent storage resources (116)) that when executed by a processor (e.g., processing resources (112)) of the network device (100) and/or other entities give rise to the functionality of the processes (e.g., 106.2, 106.4, 108.2, 108.4).

In one or more embodiments disclosed herein, all, or a part, of the functionality of the processes (e.g., 106.2, 106.4, 108.2, 108.4) is implemented using a specialized hardware device (e.g., circuitry). The specialized hardware device may be, for example, a digital signal processor, a field programmable gate array, a network data unit processor, or an application specific integrated circuit. The functionality of the processes (e.g., 106.2, 106.4, 108.2, 108.4) may be provided using other types of specialized hardware devices without departing from embodiments disclosed herein.

As discussed above, the network device (10) may control the allocation of the computing resources (110) when in an out of computing resources state. To do so, the process terminator (104) may provide process termination services. Process termination services may include terminating one or more processes of the processes (e.g., 106.2, 106.4, 108.2, 108.4) while the network device (100) is in an out of computing resources operating state. The process terminator (104) may terminate processes based on the relative importance of each of the processes (e.g., 106.2, 106.4, 108.2, 108.4) with respect to enabling the network device (100) to perform its primary functionality (106).

For example, the process terminator (104) may preferentially terminate processes of the processes (e.g., 106.2, 106.4, 108.2, 108.4) that do not contribute to the primary functionality of the network device (100). By doing so, portions of the computing resources (110) allocated to processes that are terminated by the process terminator (104) may be freed and/or reallocated to other processes that may be more likely to contribute to the primary functionality of the network device.

In one or more embodiments disclosed herein, the process terminator (104) terminates the processes (e.g., 106.2, 106.4, 108.2, 108.4) based on a ranking of the processes (e.g., 106.2, 106.4, 108.2, 108.4). The ranking may specify an ordering of the processes (e.g., 106.2, 106.4, 108.2, 108.4) with respect to whether each of the processes (e.g., 106.2, 106.4, 108.2, 108.4) contributes to the primary functionality of the network device (100). The process terminator (104) may utilize the ranking of the processes (e.g., 106.2, 106.4, 108.2, 108.4) to preferentially terminate processes that do not contribute to the primary functionality of the network device (100).

In one or more embodiments disclosed herein, the process terminator (104) is instantiated when the network device (100) is in (or enters) an out of computing resources state. The process terminator (104) may be terminated when the network device (100) is not in the out of computing resources state. Thus, the process terminator (104) may not always being provided its functionality, as indicated by the short-dotted line used to outline the process terminator (104) in FIG. 1.2.

In one or more embodiments disclosed herein, instantiation of the process terminator (104) may be used by the computing resource manager (102) as an indication that the network device (100) has entered an out of computing resources operating state. For example, the computing resource manager (102) may use the instantiation of the process terminator (104) as a signal to change the manner in which it is managing the computing resources (110) (e.g., rationing allocation of the computing resources (110)).

In one or more embodiments disclosed herein, all or a portion of the functionality of the process terminator (104) is implemented using a logical entity that utilizes the computing resources (110) of the network device (100) for performing its functionality. For example, the process terminator (104) may be implemented using computer instructions stored in persistent storage (e.g., persistent storage resources (116)) that when executed by a processor (e.g., processing resources (112)) of the network device (100) and/or other entities give rise to the functionality of the process terminator (104).

In one or more embodiments disclosed herein, all, or a part, of the functionality of the process terminator (104) is implemented using a specialized hardware device (e.g., circuitry). The specialized hardware device may be, for example, a digital signal processor, a field programmable gate array, a network data unit processor, or an application specific integrated circuit. The functionality of the process terminator (104) may be provided using other types of specialized hardware devices without departing from embodiments disclosed herein.

As discussed above, the network device (10) may ration allocation of the computing resources (110) when in an out of computing resources state. In one or more embodiments disclosed herein, the computing resources (110) are resources for performing the functionalities (e.g., 106, 108) of the network device (100). The computing resources (110) may include processing resources (112), memory resources (114), persistent storage resources (116), and/or communications resources (118). The aforementioned resources may be provided via any combination of physical devices and/or logical devices.

For example, the processing resources (112) may be provided, in part, by physical devices such as central processing units. In another example, the processing resources (112) may be provided, in part, by a virtualized processor that is implemented using all, or a portion, of the processing resources of any number of physical devices.

In another example, the memory resources (114) may be provided, in part, by physical devices such as dual in-line memory modules and/or other types of physical memory devices. In another example, the memory resources (114) may be provided, in part, by a virtualized memory that is implemented using all, or a portion, of the memory resources of any number of physical devices.

In a further example, the persistent storage resources (116) may be provided, in part, by physical devices such as hard disk drives, solid state drives, and/or other types of physical storage devices. In another example, the persistent storage resources (116) may be provided, in part, by a virtualized storage that is implemented using all, or a portion, of the storage resources of any number of physical devices.

In a still further example, the communications resources (118) may be provided, in part, by physical devices such as network adapters, network data unit processors, and/or other types of physical communications devices. In another example, the communications resources (118) may be provided, in part, by a virtualized communication provider that is implemented using all, or a portion, of the communications resources of any number of physical devices.

In one or more embodiments disclosed herein, the memory resources (114) include memory that is used to store process data. Process data may be data stored in the memory as part of the operation of the processes (e.g., 106.2, 106.4, 108.2, 108.4). To enable the processes (e.g., 106.2, 106.4, 108.2, 108.4) to utilize the memory resources (114), the computing resource manager (102) may allocate different portions of the memory resources (114) to various processes of the processes (e.g., 106.2, 106.4, 108.2, 108.4). Once allocated, only the process to which the portion of the memory resources (114) is allocated may be able to store data in, retrieve data from, or otherwise utilize the allocated portion of the memory resources (114). Consequently, once all of the memory resources (114) are allocated, the network device (100) may enter an out of computing resources state because the computing resource manager (102) may be unable to allocate memory resources (114) when requested by the processes (e.g., 106.2, 106.4, 108.2, 108.4) (and/or other entities).

To enable memory resources (114) to be allocated in such a state, the process terminator (104) may terminate one or more of the processes (e.g., 106.2, 106.4, 108.2, 108.4) to deallocate the allocated memory resources (114). By doing so, free memory resources may be made available for allocation to one or more of the processes (e.g., 106.2, 106.4, 108.2, 108.4). Additionally, the computing resource manager (102) may perform an action set to improve the likelihood that memory resources (114) will be available for allocation in the future. For additional details regarding performing an action set, refer to FIG. 2.1. Similar steps may be taken to free other types of computing resources for allocation.

While the network device (10) of FIG. 1.1 has been illustrated and described as including a limited number of specific components, a network device in accordance with one or more embodiments disclosed herein may include additional, fewer, and/or different components without departing from embodiments disclosed herein.

As discussed above, a computing resource manager (102, FIG. 1.1) may take action in response to a network device entering an out of computing resources state to improve the likelihood that the network device is able to continue to provide its primary functionality. FIGS. 2.1-2.4 show diagrams of methods that may be performed by a network device in accordance with one or more embodiment disclosed herein when responding to the detection of an out of computing resources state.

FIG. 2.1 shows a flowchart describing a method for operating a network device in accordance with one or more embodiments disclosed herein. The method may be performed by, for example, a computing resources manager (e.g., 102, FIG. 1.1) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 200, a resource availability state change of a network device to an out of computing resources state is detected. The out of computing resources state may be detected by monitoring the utilization rate of memory resources (and/or other types of computing resources) of the network device. For example, the change to the out of computing resources state may be detected based on when all of the memory resources of the network device are allocated. In other words, the out of computing resources state may be detected when a process requests that computing resources be allocated but no computing resources of the type(s) requested is/are available for allocation. The resource availability state change may be detected via other methods without departing from embodiments disclosed herein.

In Step 202, an operational state reliability of the network device is changed from a high reliability operational state to a reduced computing resources utilization operational state. While in the high reliability operational state, the network device may allocate computing resources such as memory resources to processes without rationing of the computing resources. While in the reduced computing resources utilization operational state, the network device may ration the allocation of computing resources and/or may free up allocated computing resources to improve the ability of the network device to allocate computing resources for performing of the primary functionality of the network device.

To change the operational state of the network device, an action set may be performed. The action set may include any number of actions that modify the operation of the network device to conform its operational state to that of a reduced computing resources utilization operational state. The action set may include performing one or more of the methods illustrated in FIGS. 2.2-2.4. The action set may include performing additional, different, and/or fewer methods than those illustrated in FIGS. 2.2-2.4 without departing from embodiments disclosed herein.

The operating state of the network device may be set by, for example, setting a parameter in a configuration file that specifies the operating state of the network device. When the network device is operating, it may conform its operation to the operating state specified in the configuration file. For example, one or more processes may include different sets of computer readable instructions each being respectively associated with an operating state. To conform its operation to the specified state, the network device may selectively cause only those computer readable instructions associated with the operating state to be executed by the network device.

By changing the operational state to a reduced computing resources utilization operational state, the quantity of computing resources available for allocation to processes may be increased. Consequently, the processes that are being hosted by a network device may have increased access to computing resources to perform their functionalities.

In Step 204, the network device operates in the reduced computing resources utilization operational state until the resource availability state is remediated from the out of computing resources state. Remediating the out of computing resources state may include, for example, an administrator modifying the operation of the network device. For example, the administrator may modify the operation of the network device by reducing the number of processes that may be hosted by the network device when the network device operates in a high reliability operating state. Once the out of computing resources state is remediated, the network device may begin operating in a high reliability operating state. Prior to operating in the high reliability operating state, the configuration file specifying the operating state of the network device may be modified to indicate that the network device is operating in the high reliability operating state. The configuration file may be modified manually by an administrator and/or automatically by a processes hosted by the network device that monitors the availability of the computing resources and modifies the configuration file based on the monitoring (e.g., to indicate out of computing resources operating state when there is insufficient computing resources for allocation purposes and to indicate a high reliability operating state when there are sufficient computing resources for allocation purposes).

For example, the network device may operate in the reduced computing resources utilization operational state for a predetermined period of time. The predetermined period of time may be from when the out of computing resources state starts until the out of computing resources state is resolved. The out of computing resources state may be resolved by, for example, the network device having sufficient memory resources (or another type of computing resources) for allocation purposes (e.g., leaving the out of computing resources state) and/or having an administrator of the network device or a process modify the operating state to a high reliability operating state.

The method may end following step 204.

As noted above, FIGS. 2.2-2.4 show methods that may (all or a portion) be performed when changing an operational state of a network device to a reduced computing resources utilization operational state.

FIG. 2.2 shows a flowchart describing a first method for changing an operational state of a network device in accordance with one or more embodiments disclosed herein. The method may be performed by, for example, a computing resources manager (e.g., 102, FIG. 1.1) of a network device. Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 210, at least one non-essential process of the processes is identified.

A non-essential process may be a process that does not contribute to the primary functionality of the network device. A non-essential process may be, for example, a secondary process. Any number of non-essential processes may be identified in step 210.

The at least one non-essential process may be based on rankings of the processes hosted a network device. The rankings, as discussed above, may rank the processes with respect to the importance of the processes with respect to enabling the network device to perform its primary functionality. Any of the processes that are indicated as being non-essential by the rankings may be identified as one or more of the at least one non-essential process of the processes.

In step 212, any new instances of the process are prevented from being instantiated while the network device is in the reduced computing resources utilization operational state. To prevent the new instances of the processes from being instantiated, a list of processes that may not be instantiated may be maintained. Any processes listed in the list may be prevented from being instantiated by, for example, a computing resources manager. By doing so, instances of processes that do not contribute to primary functionality of a network device and would otherwise be instantiated for device reliability purposes may be prevented from being instantiated. Consequently, memory resources (and/or other types of computing resources) may be rationed by prevent the memory resources from being allocated to new instances of processes that do not contribute to the primary functionality of the network device.

The list of processes may be generated as processes are terminated. For example, when a process is terminated an indicator of the process may be added to the list of processes.

By preventing new instances of the process from being instantiated, new instances of the process that would normally be automatically instantiated may be prevented from being instantiated. For example, as noted above, a network device may attempt to automatically instantiate new instances of processes after certain processes that typically contribute to the functionality of the network device are terminated. By maintaining a list of processes that are not to be instantiated, such automatic instantiation of processes may be prevented.

The method may end following step 212.

FIG. 2.3 shows a flowchart describing a second method for changing an operational state of a network device in accordance with one or more embodiments disclosed herein. The method may be performed by, for example, a computing resources manager (e.g., 102, FIG. 1.1) of a network device. Other entities may perform the method of FIG. 2.3 without departing from embodiments disclosed herein.

While the various steps in the flowchart shown in FIG. 2.3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 220, at least one functionality of the network device is identified that is not the primary functionality of the network device.

The at least one functionality may be, for example, a control algorithm for cooling the network device, a control algorithm for a user interface (e.g., light emitting diodes) of the network device, a file system of the network device, or any other type of control plane functionality of the network device that does not contribute to the primary functionality of the network device. The identification may be made by comparing the functionalities of the network device to a list of functionalities that specifies whether each of the listed functionalities is a primary functionality. If the list indicates that the functionality is not a primary functionality, the functionalities may be identified in step 220. The list may be maintained by, for example, an administrator.

In step 222, the at least one functionality of the network device is modified to reduce its computing resources foot print. Reducing the computing resources footprint of the at least one functionality may increase the amount of computing resources available for allocation.

In one or more embodiments disclosed herein, the at least one functionality of the network device is modified by replacing it with a lower computing resource utilization functionality. For example, a simplified file system may be loaded, a simplified algorithm for controlling a cooling system of the network device may be loaded, and/or any other type of simplified functionality may be used to replace the at least one functionality of the network device. In other words, an existing process providing the at least one functionality may be terminated and a new process that provides the lower computing resource utilization functionality may be instantiated.

In one or more embodiments disclosed herein, the at least one functionality of the network device is modified by terminating a process associated with the functionality and instantiating a new instance of the process. By doing so, the computing resource utilization of the new instance of the process may be reduced when compared to the now terminated processes. For example, terminating an instance of a process may release memory resources used to store a cache or other type of data structure. When a new instance of the process is instantiated, memory resources may be allocated for storage of a similar cache or other type of data structure but at a substantially reduced size. Similar reductions in the use of other types of computing resources may also be provided by terminating and instantiating a new instance of a process or other type of logical entity.

The method may end following step 222.

FIG. 2.4 shows a flowchart describing a third method for changing an operational state of a network device in accordance with one or more embodiments disclosed herein. The method may be performed by, for example, a computing resources manager (e.g., 102, FIG. 1.1) of a network device. Other entities may perform the method of FIG. 2.4 without departing from embodiments disclosed herein.

While the various steps in the flowchart shown in FIG. 2.4 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 230, at least one entity is notified that the network device is in the reduced computing resources utilization operational state. The notification may be made by, for example, sending an electronic communication to a computing device associated with the at least one entity. The electronic communication may be, for example, an electronic mail, a text message, an instant message, or any other type of electronic communication. The electronic communication may indicate that the network device is in the reduced computing resources utilization operational state. The electronic communication may include additional, different, and/or less information without departing from embodiments disclosed herein.

The method may end following step 230.

By performing any and/or all of the methods illustrated in FIGS. 2.1-2.4, a network device in accordance with one or more embodiments disclosed herein may automatically address an out of computing resources state by freeing up memory resources (or other types of computing resources) so that the network device may maintain the quality of its primary functionality. For example, by freeing up memory resources, the memory resources may be allocated towards one or more processes that support the primary functionality of the network device. The primary functionality may be, for example, forwarding network data units In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fiber channel device, an Infini-Band® device, etc. A network device (100) is not limited to the aforementioned specific examples.

In one or more embodiments, a network device (100) includes functionality to receive network data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (100).

In one or more embodiments, a network device (100) also includes and/or is operatively connected to device storage and/or device memory (i.e., non-transitory computer readable mediums used to provide persistent storage resources and/or memory resources) storing software and/or firmware.

Such software and/or firmware may include instructions which, when executed by the one or more processors (not shown, e.g., part of the processing resources (112)) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various elements of a network. As will be discussed in greater detail below, the network device (100) may utilize devices disposed in the device receivers (e.g., 104, 105) to facilitate network connectivity.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments of the invention, a non-limiting example is provided in FIGS. 3.1-3.6. Each of these figures may illustrate a system similar to that illustrated in FIG. 1.1 at different points in times. For the sake of brevity, only a limited number of components of the system of FIG. 1.1 are illustrated in each of FIGS. 3.1-3.6.

Example

Consider a scenario as illustrated in FIG. 3.1 in which a client (320) is attempting to communicate with network devices (e.g., 300, 302, 304, 306, 308, 310). To communicate with the network devices, the client (320) may send network data units (e.g., 322) to network device A (300) via an operable connection as illustrated by the line having arrows on both end interconnecting the client (320) and the network device A (300).

Similarly, each of the other network devices may be operably connected to each other directly or through other network devices. For example, network device A (300) may be operably connected to network devices B and D (302, 306, respectively). Consequently, if network device A (300) obtained network data units (e.g., 322) from the client (320) that are to be forwarded towards other network devices operably connected to network device B or network device D, then network device A (300) may forward the network data units to one of these network devices (which in turn may forward the network data units towards other devices if implicated by information included in the network data units).

To forward network data units, network device A (300) may processes information obtained from a variety of sources to maintain forwarding information. The forwarding information may be used to determine to which network device (e.g., 302, 306) to forward different network data units.

For example, network device D (306) may periodically send network discovery information to network device A (300) regarding the logical and/or physical network connectivity between itself and other network devices. Upon receipt of such information, network device A (300) may process the information to determine whether it should update its forwarding information used to forward network data units.

At a first point in time as illustrated in FIG. 3.2, network device B (302) enters a compromised state. Network device B (302) may enter a compromised state when, for example, a malicious attacker compromises the functionality of the network device, computer instructions which control the operation of the network device are corrupted, etc.

While in the compromised state as illustrated in FIG. 3.3, the network device B (302) begins sending network discovery protocol data units (330) to network device A (300). The network discovery protocol data units (330) may be unsolicited by network device A (300), may not include information that may be used by the network device A (300) to update its forwarding information, and may be being sent repeatedly or in a manner that is inconsistent with a network discovery protocol.

Upon receipt of the network discovery protocol data units (330), a network map manager (350) of the network device (10) as illustrated in FIG. 3.4 begins processing the network discovery protocol data units. Because of the sheer number of network discovery protocol data units being processed by the network map manager (350), the network device (10) enters an out of computing resources state which, if left unchecked, would impair the ability of the network data unit forwarder (340) from forwarding network data units.

Specifically, as the network map manager (350) processes network discovery protocol packets, the network map manager (350) progressively requests more and more of the memory resources (114) of the computing resources (110) of the network device (10).

In response to determining that network device A (300) has entered an out of computing resources state, the computing resources manager (102) causes computing resources (110) of the network device A (300) to be freed. To do so, as illustrated in FIG. 3.5, the computing resource manager (102) instructs the process terminator (104) to terminate processes that support the secondary functionality (120) of the network device A (300) including the network map manager (350). By doing so, the memory resources that were allocated to the network map manager (350) are freed for use by other processes.

Additionally, the computing resource manager (102) causes the network data unit forwarder to operate in a reduced memory footprint state (e.g., a reduced memory footprint network data unit forwarder (342)). For example, the computing resource manager (102) may cause the process terminator (104) to terminate the network data unit forwarder and instantiate a new instance of the network data unit forwarder to obtain the reduced memory footprint network data unit forwarder (342).

Further, the computing resource manager (102) sends a state notification (362) to an administrator (360) indicating that the network device A (300) is in an out of computing resources state operational state. The state notification (362) may also include other relevant such as, for example, a list of the processes executing when the out of computing resources state was encountered, a quantity of each of the computing resources (110) allocated to each of the processes when the out of computing resources state was encountered.

By taking the above actions, the network device A (300) is able to continue to provide computing resources (110) to the processes associated with its primary functionality (106) even when in an out of computing resources state. For example, as illustrated in FIG. 3.6, the network device A (300) is able to forward network data units (322) from the client (320) even when in an out of computing resources state.

End of Example

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
   computing resources for utilization by processes hosted by the network device; and
   a computing resources manager programmed to:
      automatically instantiate a new instance of a first process of the processes upon termination of the first process;
      make a determination that the network device has entered an out of computing resources state; and
      in response to the determination:
         perform an action set to increase a quantity of the computing resources that are available for allocation to the processes, wherein the action set comprises:
            preventing the new instance of the first process from being automatically instantiated by the computing resources manager.

2. The network device of claim 1, wherein the first process is associated with secondary functionality of the network device.

3. The network device of claim 1, wherein the action set further comprises:
   terminating the first process; and
   instantiating the new instance of the first process.

4. The network device of claim 3, wherein terminating the first process removes a cache stored in memory resources of the computing resources that is utilized by the first process, wherein instantiating the new instance of the first process instantiates a new cache for the new instance of the first process, wherein the new cache utilizes a first portion of the memory resources that is smaller than a second portion of the memory resources that was utilized by the cache prior to removal of the cache.

5. The network device of claim 1, wherein performing the action set further comprises:
   disabling at least one secondary functionality of the network device.

6. The network device of claim 1, wherein performing the action set further comprises:
   sending a notification indicating that the network device has entered the out of computing resources state.

7. A method, comprising:
   automatically instantiating a new instance of a first process of processes upon termination of the first process, wherein the processes are hosted by a network device, wherein the processes utilize computing resources of the network device;
   making a determination that the network device has entered an out of computing resources state; and
   in response to the determination:
      performing an action set to increase a quantity of the computing resources that are available for allocation to the processes, wherein the action set comprises preventing the new instance of the first process from being automatically instantiated by the network device.

8. The method of claim 7, wherein the first process is associated with secondary functionality of the network device.

9. The method of claim 7, wherein the action set further comprises:
   terminating the first process; and
   instantiating the new instance of the first process.

10. The method of claim 9, wherein terminating the first process removes a cache stored in memory resources of the computing resources that is utilized by the first process, wherein instantiating the first new instance of the first process instantiates a new cache for the new instance of the first process, wherein the new cache utilizes a first portion of the memory resources that is smaller than a second portion of the memory resources that was utilized by the cache prior to removal of the cache.

11. The method of claim 7, wherein performing the action set further comprises:
    disabling at least one secondary functionality of the network device.

12. The method of claim 7, wherein performing the action set further comprises:
    sending a notification indicating that the network device has entered the out of computing resources state.

13. A non-transitory computer-readable medium comprising computer readable program code, which when executed by a computer processor enables the computer processor to perform a method, the method comprising:
    automatically instantiating a new instance of a first process of processes upon termination of the first process, wherein the processes are hosted by a network device, wherein the processes utilize computing resources of the network device;
    making a determination that the network device has entered an out of computing resources state; and
    in response to the determination:
       performing an action set to increase a quantity of the computing resources that are available for allocation to the processes, wherein the action set comprises preventing the new instance of the first process from being automatically instantiated by the network device.

14. The non-transitory computer-readable medium of claim 13, wherein the first process is associated with secondary functionality of the network device.

15. The non-transitory computer-readable medium of claim 13, wherein the action set further comprises:
    terminating the first process; and
    instantiating the new instance of the first process.

16. The non-transitory computer-readable medium of claim 15, wherein terminating the first process removes a cache stored in memory resources of the computing resources that is utilized by the first process, wherein instantiating the first new instance of the first process instantiates a new cache for the new instance of the first process, wherein the new cache utilizes a first portion of the memory resources that is smaller than a second portion of the memory resources that was utilized by the cache prior to removal of the cache.

17. The non-transitory computer-readable medium of claim 13, wherein performing the action set further comprises:

disabling at least one secondary functionality of the network device.

* * * * *